United States Patent
Srinivasan et al.

(10) Patent No.: US 12,399,753 B2
(45) Date of Patent: Aug. 26, 2025

(54) COMPUTATIONAL RESOURCE ALLOCATION ADVISOR FOR ELASTIC CLOUD DATABASES

(71) Applicant: Accenture Global Solutions Limited, Dublin (IE)

(72) Inventors: Madhan Kumar Srinivasan, Bangaluru (IN); Guruprasad P V, Bangalore (IN); Kishore Kumar Gajula, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 567 days.

(21) Appl. No.: 17/871,317

(22) Filed: Jul. 22, 2022

(65) Prior Publication Data

US 2024/0028397 A1    Jan. 25, 2024

(51) Int. Cl.
| | |
|---|---|
| *G06F 9/50* | (2006.01) |
| *G06F 9/455* | (2018.01) |
| *G06F 9/48* | (2006.01) |
| *G06F 16/21* | (2019.01) |

(52) U.S. Cl.
CPC ............ *G06F 9/5083* (2013.01); *G06F 9/455* (2013.01); *G06F 9/45533* (2013.01); *G06F 9/45558* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5088* (2013.01); *G06F 16/217* (2019.01); *G06F 2009/4557* (2013.01)

(58) Field of Classification Search
CPC .. G06F 9/455; G06F 9/45533; G06F 9/45558; G06F 9/48; G06F 9/4806; G06F 9/4843; G06F 9/4881; G06F 9/50; G06F 9/5005; G06F 9/5061; G06F 9/5083; G06F 9/5088; G06F 16/217; G06F 2009/4557
See application file for complete search history.

(56) References Cited

U.S. PATENT DOCUMENTS

| | | |
|---|---|---|
| 8,886,781 B2 | 11/2014 | Jain et al. |
| 10,069,903 B2 | 9/2018 | Sorenson, III et al. |
| 11,599,389 B2 | 3/2023 | Harjono et al. |

(Continued)

OTHER PUBLICATIONS

Yu et al, "Intelligent Database Placement in Cloud Environment", 2012 IEEE 19th International Conference on Web Services, pp. 544-551. (Year: 2012).*

*Primary Examiner* — Charles M Swift
(74) *Attorney, Agent, or Firm* — POLSINELLI PC

(57) ABSTRACT

Methods, computer systems, and apparatus, including computer programs encoded on computer storage media, for allocating computation resources for a plurality of databases. For each database, the system identifies a respective initial computation capacity tier for the respective database based at least on the respective utilization of the respective database. For each of a set of optimization orders, the system determines a respective set of candidate resource pools for accommodating the plurality of databases. The system selects an optimization order and determines a final set of resource pools for the plurality of databases. The system outputs data specifying the final set of resource pools.

20 Claims, 7 Drawing Sheets

(56) References Cited

U.S. PATENT DOCUMENTS

| | | | |
|---|---|---|---|
| 2014/0196027 A1* | 7/2014 | Osogami | G06F 9/45558 |
| | | | 718/1 |
| 2016/0378563 A1* | 12/2016 | Gaurav | G06F 9/45558 |
| | | | 718/1 |
| 2020/0409584 A1 | 12/2020 | Matsumoto et al. | |
| 2022/0164228 A1* | 5/2022 | Volobuev | G06F 16/217 |
| 2023/0017824 A1 | 1/2023 | Park et al. | |

* cited by examiner

| TIER | Total DTUs | Max DTUs per DB | Max Storage per DB (GB) | Max Storage (GB) | Max # of DBs | Max Concurrent Requests |
|---|---|---|---|---|---|---|
| Basic1 | 50 | 5 | 2 | 5 | 100 | 100 |
| Basic2 | 100 | 5 | 2 | 10 | 200 | 200 |
| Basic3 | 200 | 5 | 2 | 20 | 500 | 400 |
| Basic4 | 300 | 5 | 2 | 29 | 500 | 600 |
| Basic5 | 400 | 5 | 2 | 39 | 500 | 800 |
| Basic6 | 800 | 5 | 2 | 78 | 500 | 1600 |
| Basic7 | 1,200 | 5 | 2 | 117 | 500 | 2400 |
| Basic8 | 1,600 | 5 | 2 | 156 | 500 | 3200 |
| Standard1 | 50 | 50 | 500 | 500 | 100 | 100 |
| Standard2 | 100 | 100 | 750 | 750 | 200 | 200 |
| Standard3 | 200 | 200 | 1024 | 1024 | 500 | 400 |
| Standard4 | 300 | 300 | 1024 | 1280 | 500 | 600 |
| Standard5 | 400 | 400 | 1024 | 1536 | 500 | 800 |
| Standard6 | 800 | 800 | 1024 | 2048 | 500 | 1600 |
| Standard7 | 1,200 | 1,200 | 1024 | 2560 | 500 | 2400 |
| Standard8 | 1,600 | 1,600 | 1024 | 3072 | 500 | 3200 |
| Standard9 | 2,000 | 2,000 | 1024 | 3584 | 500 | 4,000 |
| Standard10 | 2,500 | 2,500 | 1024 | 4096 | 500 | 5,000 |
| Standard11 | 3,000 | 3,000 | 1024 | 4096 | 500 | 6,000 |
| Premium1 | 125 | 125 | 1,024 | 1024 | 50 | 200 |
| Premium2 | 250 | 250 | 1,024 | 1024 | 100 | 400 |
| Premium3 | 500 | 500 | 1,024 | 1024 | 100 | 800 |
| Premium4 | 1,000 | 1,000 | 1,024 | 1024 | 100 | 1600 |
| Premium5 | 1,500 | 1,000 | 1,024 | 1536 | 100 | 2400 |
| Premium6 | 2,000 | 1,750 | 1,024 | 2048 | 100 | 3200 |
| Premium7 | 2,500 | 1,750 | 1,024 | 2560 | 100 | 4,000 |
| Premium8 | 3,000 | 1,750 | 1,024 | 3072 | 100 | 4,800 |
| Premium9 | 3,500 | 1,750 | 1,024 | 3584 | 100 | 5,600 |
| Premium10 | 4,000 | 4,000 | 1,024 | 4096 | 100 | 6,400 |

FIG. 2A

Tier #1 - standard1

| DB ID | Aggr DTU Utilization | Pool Tier Label |
|---|---|---|
| DB1 | 14 | Standard1 |
| DB2 | 4 | Standard1 |
| DB3 | 26 | Standard1 |
| DB5 | 5 | Standard1 |
| DB6 | 28 | Standard1 |
| DB8 | 16 | Standard1 |
| DB9 | 23 | Standard1 |
| DB10 | 39 | Standard1 |
| DB12 | 16 | Standard1 |
| DB13 | 9 | Standard1 |
| DB14 | 8 | Standard1 |
| DB16 | 6 | Standard1 |
| DB17 | 10 | Standard1 |
| DB18 | 41 | Standard1 |
| DB19 | 26 | Standard1 |
| DB20 | 37 | Standard1 |
| DB26 | 16 | Standard1 |

Tier #2 - standard2

| DB ID | Aggr DTU Utilization | Pool Tier Label |
|---|---|---|
| D84 | 69 | Standard2 |
| D822 | 87 | Standard2 |
| D833 | 72 | Standard2 |
| D838 | 61 | Standard2 |
| D839 | 77 | Standard2 |
| D840 | 87 | Standard2 |

Tier #3 - standard3

| DB ID | Aggr DTU Utilization | Pool Tier Label |
|---|---|---|
| D87 | 114 | Standard3 |
| D815 | 192 | Standard3 |
| D821 | 165 | Standard3 |
| D823 | 151 | Standard3 |
| D825 | 136 | Standard3 |
| D827 | 162 | Standard3 |
| D831 | 113 | Standard3 |
| D834 | 163 | Standard3 |
| D836 | 130 | Standard3 |
| D837 | 117 | Standard3 |

Tier #4 - standard4

| DB ID | Aggr DTU Utilization | Pool Tier Label |
|---|---|---|
| D811 | 250 | Standard4 |
| D824 | 257 | Standard4 |
| D828 | 232 | Standard4 |
| D829 | 254 | Standard4 |
| D830 | 236 | Standard4 |
| D832 | 243 | Standard4 |
| D835 | 229 | Standard4 |
| D841 | 282 | Standard4 |
| D842 | 266 | Standard4 |

FIG. 2B

COMPUTATIONAL RESOURCE ALLOCATION ADVISOR FOR ELASTIC CLOUD DATABASES

FIELD

This specification relates to allocating computation resources to computer data and computer data operations. In particular, this specification relates to allocating computation resources to databases.

BACKGROUND

Rapid advances in communications and storage technologies, driven by immense customer demand, have resulted in the widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

SUMMARY

This specification describes computer-implemented systems and methods for allocating computation resources to a plurality of databases.

In this specification, a database refers to an organized collection of data stored and accessed electronically, and can be usually controlled by a database management system. For example, the plurality of databases can be hosted on computer clusters (e.g., computer servers) in cloud storage.

In this specification, the computation resource for a database (also termed as database-compute resource in this specification) can include resources for computation, memory, or I/O operations, or a combination of these resources. As a particular example of a measure of the computation resource, a database transaction unit (DTU) represents a blended measure of CPU, memory, reads, and writes.

One or more computer servers can provide the computation resource (e.g., DTUs) to one or more databases. In order to improve the efficiency of resource utilization, databases can share computational resources in elastic pools. Because simultaneous peak activity for different databases may be a rare coincidence in some database use contexts, multiple different databases with similar peak database-compute usage (e.g., maximum utilization, above threshold utilization, or other peak utilization) can be multiplexed onto the same pool of database-compute resources. As an example, a particular database-compute pool can be hosted on a particular server or a particular computer cluster that has a fixed limit of computation resources.

Pooling (i.e., aggregating) multiple databases onto a shared set of computing resources allows multiple databases to be serviced with peak database-compute resources that are less than the sum of all the peaks of the individual multiplexed databases. For example, if a first database has a short peak of 100% utilization and 0% utilization at all other times, it may be pooled with a second database that also has a short peak of 100% utilization and 0% at all other times. Rather than using a database-compute capacity double that of the two databases, the pooled databases can operate with the same database-compute capacity as a single one of the individual databases, assuming the two 100% peaks do not overlap in time.

Accordingly, this specification provides techniques for allocating computation resources to a plurality of databases by identifying candidate databases for being pooled into computation resource pools. The candidate databases being pooled into the same particular computation resource pool can share the database-compute resources provided by the computation resource pool in a multiplexed fashion.

In one particular aspect, the specification provides an allocation method for allocating computation resources. The training method can be performed by a system comprising one or more computers. For each respective database of the plurality of databases, the system identifies, from a list of computation capacity tiers, a respective initial computation capacity tier for the respective database based at least on the respective utilization of the respective database. For each respective optimization order of a set of optimization orders, the system determines a respective set of candidate resource pools for accommodating the plurality of databases. In particular, the system aggregates the plurality of databases into a respective set of one or more partitions based at least on the respective optimization order and the identified initial computation resource tier of each database, and performs an optimization according to an optimization objective, to pool the databases in each particular partition in one or more of the respective set of partitions into candidate resource pools. Each candidate resource pool has a computation capacity corresponding to the highest computation capacity tier of the databases in the particular partition. The system selects an optimization order from the set of optimization orders, determines a final set of resource pools for the plurality of databases by selecting the set of candidate resource pools for the selected optimization order, and outputs data specifying the final set of resource pools.

In some implementations of the allocation method, the optimization objective includes: minimizing the total number of the candidate resource pools in the set.

In some implementations of the allocation method, the computation capacity characterizes one or more of: a CPU capacity, a memory capacity, or an I/O capacity.

In some implementations of the allocation method, for each respective database of the plurality of databases, to identify, from the list of computation capacity tiers, the respective initial computation capacity tier based at least on respective utilization of the respective database comprises, the system obtains respective time-series data characterizing utilization of the respective database, determines a respective aggregated utilization of the respective database based at least on the respective time-series data, and identifies the respective initial computation capacity tier as one of the list of computation capacity tiers that corresponds to a computation capacity accommodating the respective database and being closest to the respective aggregated utilization of the respective database.

In some implementations of the allocation method, the system receives a user input identifying a statistical aggregation parameter, determines a respective value of the statistical aggregation parameter for the respective time-series data of the respective database, and computes the respective aggregated utilization using the determined respective value of the statistical aggregation parameter and a buffer amount. For example, the statistical aggregation parameter can specify a percentile value of the time-series data.

In some implementations of the allocation method, the number of optimization orders in the set is the number of unique computation capacity tiers identified for the plurality of databases.

In some implementations of the allocation method, the set of optimization orders includes a first optimization order. To aggregate the plurality of databases into the respective set of partitions for the first optimization order, the system aggregates the plurality of databases into a first set of partitions according to the identified initial computation capacity tier of each database. Each partition of the first set of partitions includes databases having the same identified initial computation capacity tiers.

The set of optimization orders can further include one or more additional optimization orders. To aggregate the plurality of databases into the respective set of partitions for a particular additional optimization order, the system aggregates two or more neighboring partitions generated for a preceding optimization order into a single partition.

In some implementations of the allocation method, for each particular partition, the system performs a bin-packing optimization to place one or more databases in the particular partition into the respective set of one or more candidate resource pools according to an optimization measure.

In some implementations of the allocation method, the optimality measure includes one or more of: a first term that measures a ratio of: the number of candidate resource pools that include one or more databases in the set of candidate resource pools, and a total number of available resource pools; a second term computed based on the number of candidate resource pools in the set of candidate resource pools and the total number of available resource pools, or a third term that measures a ratio of: a total unused capacity of the set of candidate resource pools and a total capacity of the set of candidate resource pools. For example, the optimality measure can be computed as a weighted sum of the first term, the second term, and the third term.

In some implementations of the allocation method, the bin-packing optimization includes: a next fit (NF) optimization, a first fit (FF) optimization, a first fit decreasing (FFD) optimization, a best fit (BF) optimization, a best fit decreasing (BFD) optimization, or a branch and bound (B&B) optimization.

In some implementations of the allocation method, for each respective optimization order of a set of optimization orders, after determining the respective set of candidate resource pools, the system determines one or more of: a value for a performance measure or a value for a cost measure of the respective set of candidate resource pools, and selects the optimization order from the set of optimization orders based on one or more of the values for the performance measure or the values for the cost measure for the optimization orders.

In some implementations of the allocation method, the system receives a user input indicating a level of preference for performance over cost saving, and selects the optimization order based on the level of preference for performance.

In another aspect, this specification provides a system comprising one or more computers and one or more storage devices storing instructions that when executed by the one or more computers cause the one or more computers to perform the methods described above.

In another aspect, this specification provides one or more non-transitory computer storage media encoded with instructions that, when executed by one or more computers, cause the one or more computers to perform the methods described above.

The subject matter described in this specification can be implemented in particular embodiments so as to realize one or more of the following advantages.

The described techniques provide a method for allocating computation resources to a plurality of databases by identifying candidate databases for being pooled into computation resource pools. The candidate databases being pooled into the same particular computation resource pool can share the database-compute resources provided by the computation resource pool in a multiplexed fashion. Pooling multiple databases onto a shared set of computing resources allows multiple databases to be serviced with peak database-compute resources that are less than the sum of all the peaks of the individual multiplexed databases, and thus improve the utilization efficiency of the computation resources. However, pooling a large number (e.g., thousands) of databases onto a plurality of available resource pools is a complex optimization problem. In particular, since different databases can have different database-compute requirements and the different resource pools can have different capacities, the optimization problem can become computationally intractable for a conventional optimization method when the number of databases increases.

To solve this problem, this specification provides a two-component process to efficiently and effectively assign the plurality of databases to a plurality of resource pools. In the first component of the process, for each of a plurality of optimization orders, the system aggregates the plurality of databases into a respective set of partitions based at least on an identified initial computation resource tier of each database. In the second component of the process, the system performs an optimization to pool the databases in each partition into resource pools.

Compared with conventional methods, the provided technique makes it possible to generate high-quality resource allocation for a large number of databases in a computationally efficient manner. As a result, by using the provided techniques, it is possible to perform real-time optimized resource allocation for a large number of databases.

BRIEF DESCRIPTION OF THE DRAWINGS

FIG. 2A shows an example of a list of computation capacity tiers.

FIG. 2B shows an example of aggregating a plurality of databases according to computation capacity tiers.

Like reference numbers and designations in the various drawings indicate like elements.

DETAILED DESCRIPTION

This specification provides techniques for allocating computation resources to a plurality of databases. In particular, a computation resource allocation system determines how to pool (or aggregate) databases into computation resource pools. The databases being pooled into the same particular computation resource pool can share the database-compute resources provided by the particular computation resource pool in a multiplexed fashion.

Figure 1:
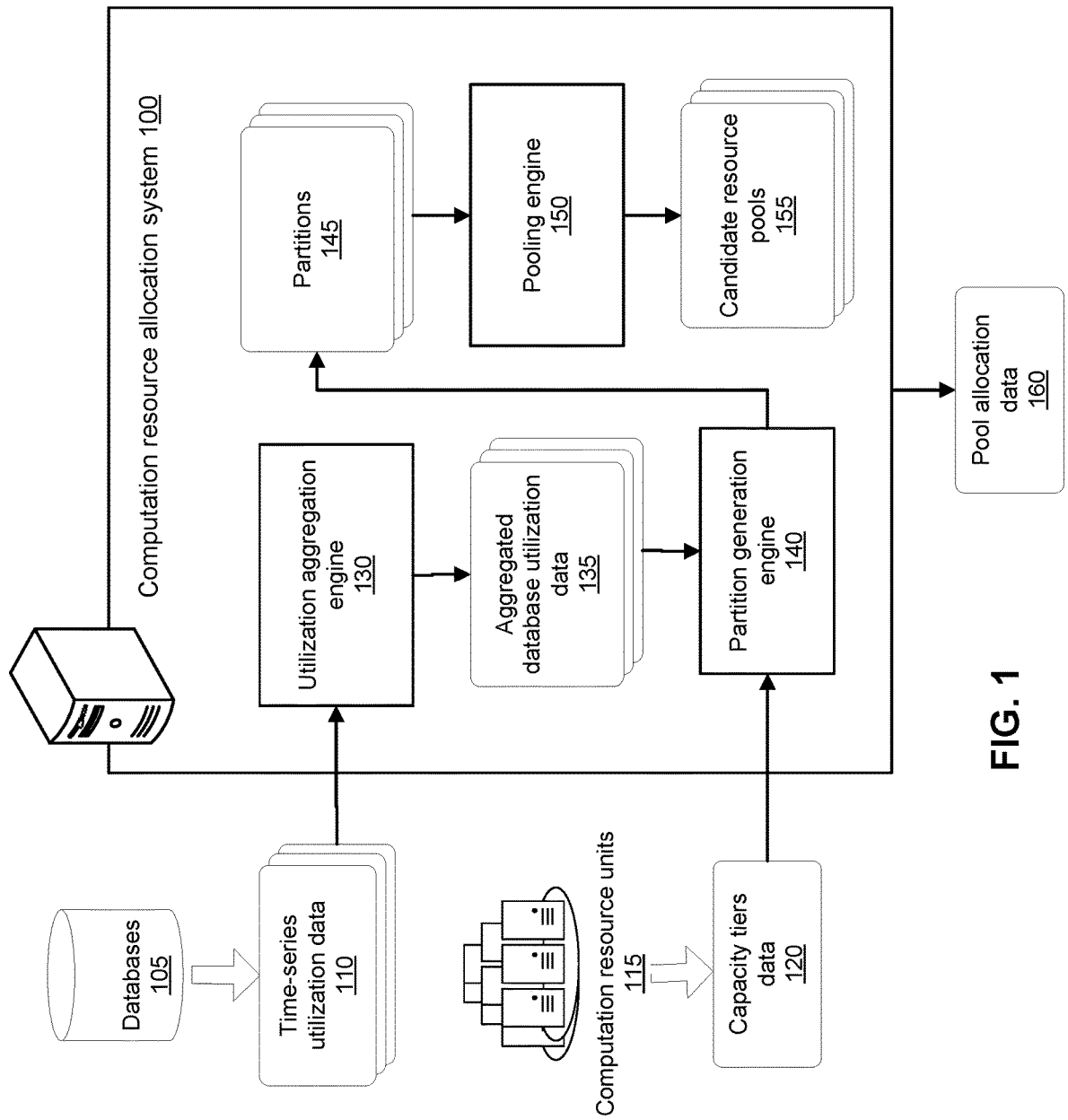
FIG. 1 shows an example system for allocating computation resources to databases.

FIG. 1 shows an example system 100 for allocating computational resources of a plurality of computation resource units 115 to a plurality of databases 105. The system 100 is an example of a system implemented as computer programs on one or more computers in one or more locations, in which the systems, components, and techniques described below can be implemented.

Each database 105 can store an organized collection of data and can be controlled by a database management system to access the stored data. For example, the plurality of databases can be hosted on computer clusters (e.g., computer servers) in cloud storage. As an example, the database can be a general-purpose relational database, e.g., a SQL database.

Each computation resource unit 115 can provide database-compute resource for one or more of the databases 105. For example, a computation resource unit 115 can be a particular server or a particular computer cluster to host one or more of the databases 105. The database-compute resource provided by the computation resource unit 115 can include a combination of CPU resources, memory resources, and I/O resources (i.e., read and write capacities). As a particular example of a measure of the computation resource, a database transaction unit (DTU) represents a blended measure of CPU, memory, read, and write resources. The computation resource unit 115 can further provide data storage capacities and access capacities, e.g., a number of maximum concurrent accessing requests.

In order to effectively allocate computation resources to a particular database 105, the system 100 needs to obtain a utilization measure for the database 105 to characterize how much computation resource is needed by the database. In order to obtain the utilization measure, the system 100 receives utilization data, e.g., time-series utilization data 110 that characterizes how much computation resource is being utilized by each database over time. In a particular example, the time-series utilization data 110 can be time-series data of DTUs utilized by the database 105.

The system includes a utilization aggregation engine 130 configured to process the time-series utilization data 110 to generate aggregated database utilization data 135 as the utilization measure for each database 105 to characterize how much computation resource is needed by the database. The aggregated database utilization data 135 can be determined for the time-series utilization data 110 based on a statistical aggregation parameter that specifies a percentile value of the time-series data. For example, the statistical aggregation parameter can be the mean (i.e., P50), P95, P99, etc., and the utilization aggregation engine 130 can determine the mean value, P95 value, P99 value, etc., of the time-series data, and compute the aggregated database utilization data 135 based on the mean value, P95 value, P99 value, etc., of the time-series data. For example, the utilization aggregation engine 130 can compute the aggregated utilization for a database as (P99 value+buff) where buff is a buffer value, e.g., buff=$\sigma$*Max., where $\sigma$ is a pre-defined buffer coefficient and Max is the maximum value of the time-series data for the database.

In some implementations, the system 100 allows a user to specify parameters for computing the aggregated database utilization data 135, for example, to specify which percentile is to be used and/or the value for the buffer coefficient. That is, the system 100 can receive a user input to indicate the parameters to be used for computing the aggregated database utilization data 135.

In many instances, the computation resource units 115 can be categorized into a variety of capacity tiers according to the computation capacity of each computation resource unit 115. The system 100 receives capacity tiers data 120 that characterizes the computation resource capacities of the computation resource units 115.

FIG. 2A shows a table illustrating an example list of computation capacity tiers. As shown in FIG. 2A, for each of the list of tiers, one or more computation resource measures can be specified in the capacity tiers data 120. Examples of the computation resource measures include parameters such as total DTUs, maximum DTUs per database, maximum storage per database, maximum storage, the maximum number of databases, and maximum concurrent requests.

Referring back to FIG. 1, the system 100 can allocate one of the computation resource units 115 to one or more databases 105 based on one or more of the computation resource measures. For example, the system 100 can allocate a first database and a second database to a particular computation resource unit 115 such that the sum of the aggregated utilization DTUs of the first database and the second database is below the total DTUs of the particular computation resource unit 115.

In order to efficiently optimize the allocation, the system 100 adopts a two-component process performed by a partition generation engine 140 and a pooling engine 150. The system 100 outputs the pool allocation data 160 to specify how to aggregate the databases 105 into a plurality of resource pools. The pool allocation data 160 can be used to assign the computation resource units 115 to the databases, that is, to assign a particular computation resource unit 115 to the databases pooled in each of the resource pools.

The partition generation engine 140 determines a plurality of partitions 145 of the databases 105 based on the aggregated database utilization data 135 and the capacity tiers data. In particular, the plurality of partitions 145 are generated for multiple optimization orders.

Concretely, the partition generation engine 140 first assigns a capacity tier to each of the databases 105. That is, for each respective database 105, the partition generation engine 140 identifies, from the list of computation capacity tiers 120, a respective initial computation capacity tier for the respective database based at least on the respective utilization of the respective database. For example, for a particular database, the partition generation engine 140 can identify the respective initial computation capacity tier as one of the list of computation capacity tiers that corresponds to a computation capacity accommodating the respective database and being closest to the respective aggregated utilization of the respective database.

FIG. 2B illustrates an example of aggregating the databases to different computation capacity tiers based on the aggregated database utilization (e.g., aggregated DTU utilization) of each database. As shown in FIG. 2B, each database is assigned to a particular tier so that the capacity of the particular tier (e.g., the total DTUs of the tier referring to FIG. 1A) can accommodate the database and that and the capacity of the particular tier is closest to the respective aggregated utilization of the respective database.

Referring back to FIG. 1, the partition generation engine 140 aggregates the databases 105 into a respective set of one or more partitions based at least on the identified initial computation resource tier of each database, and also depending on the optimization order.

Figure 2C:
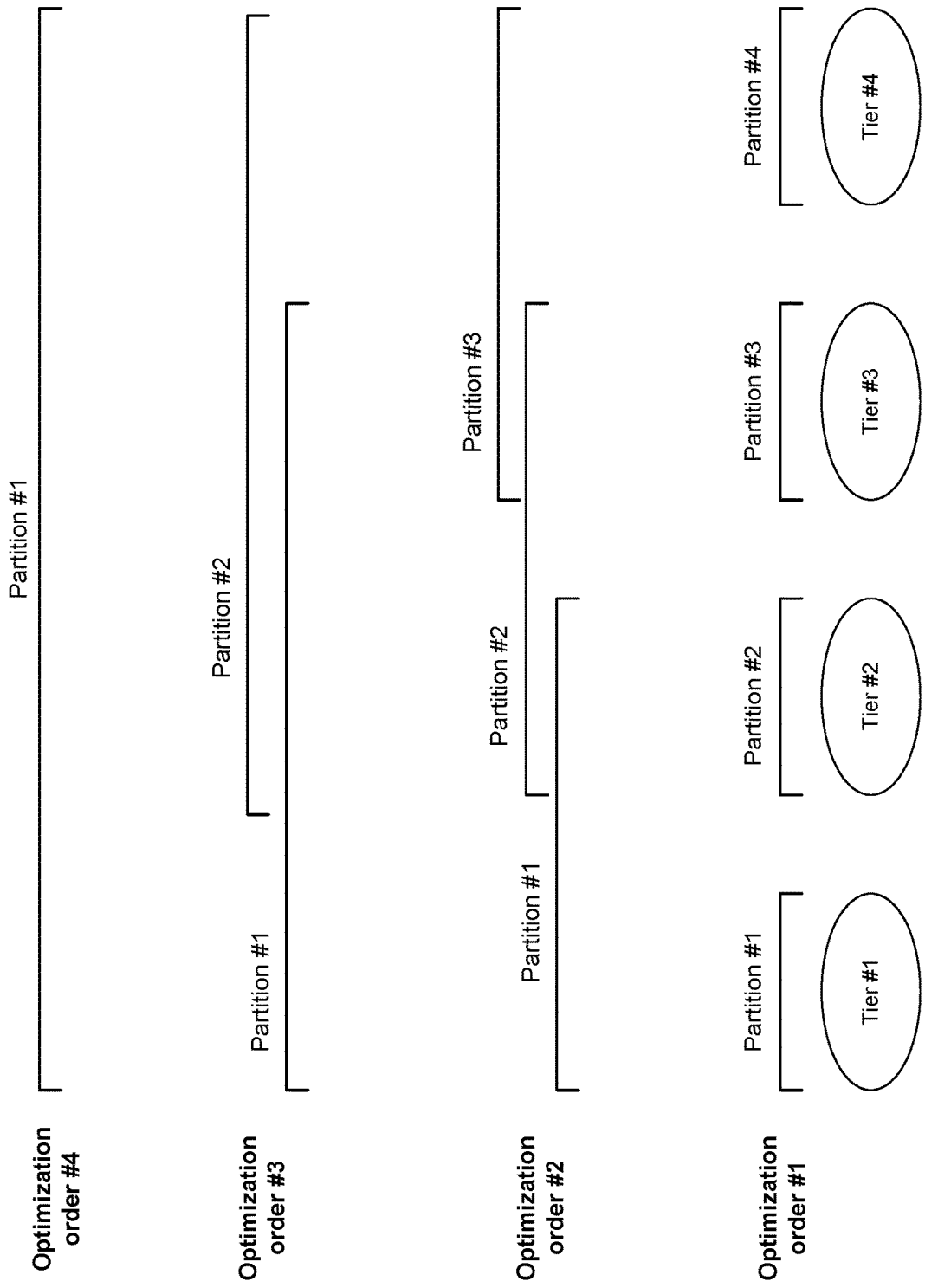
FIG. 2C shows an example of aggregating a plurality of databases into a set of partitions for each of a plurality of optimization orders.

FIG. 2C illustrates an example of aggregating the databases into partitions for each of a plurality of optimization orders including optimization orders #1-#4. As shown in FIG. 2C, for optimization orders #1, the set of partitions are generated based on the respective initial computation capacity tier assigned to each database. That is, the databases having the same initial computation capacity tier (e.g., Tier #1, Tier #2, Tier #3, and or Tier #4) are grouped in the same partition. For the next optimization order #2, two neighboring partitions generated for the preceding optimization order are grouped into a single partition. This process can be repeated for optimization order #3 and optimization order #4. As shown in FIG. 2C, for Optimization order #2, the system generates 3 partitions including: (i) Partition #1=Tier #1+Tier #2, (ii) Partition #2=Tier #2+Tier #3, and (iii) Partition #3=Tier #3+Tier #4. For Optimization order #3, the system generates two partitions including: (i) Partition #1=Tier #1+Tier #2+Tier #3 and (ii) Partition #2=Tier #2+Tier #3+Tier #4. For Optimization order #4, the system generates a single partition that includes databases in Tier #1, Tier #2, Tier #3, and Tier #4. The resulting set of partitions include both inter-grouping and intra-grouping of databases assigned to different initial capacity tiers, and thus serve as a simplified yet comprehensive basis for further pooling optimization. As a trend, a higher optimization order results in partitions with an increased level of intra-grouping of databases assigned to different initial capacity tiers. As shown in FIG. 2C, the number of optimization orders in the set is the number of unique computation capacity tiers identified for the plurality of databases. Since there are 4 identified capacity tiers, 4 optimization orders are examined.

Referring back to FIG. 1, the pooling engine 150 is configured to perform an optimization according to an optimization objective, to pool the databases in each particular partition in one or more of the respective set of partitions into candidate resource pools 155. Each candidate resource pool 155 has a computation capacity corresponding to the highest computation capacity tier of the databases in the particular partition and can accommodate the sum of the aggregated database utilization of the databases being pooled into the candidate resource pool.

After the candidate resource pools 155 have been generated, the system 100 can select an optimization order from the set of optimization orders, and determine a final set of resource pools for the plurality of databases by selecting the set of candidate resource pools for the selected optimization order. The system 100 can gen output data specifying the final set of resource pools as the pool allocation data 160.

An example of the optimization objective for performing the pooling includes minimizing the total number of candidate resource pools in the set.

In some implementations, for each of the one or more partitions, the pooling engine 150 performs a bin-packing optimization to place one or more databases in the particular partition into the respective set of one or more candidate resource pools according to an optimization measure.

In a classical bin-packing problem, the system assigns a set I of m items to a set B of n identical bins with capacity c. Each item has a size si. The goal is to minimize the number of bins used. The sum of item sizes in one bin does not exceed the bin capacity. This problem can be described as an integer optimization problem.

For the system 100, the pooling problem can be framed by considering the resource pools as bins and the DBs as the items. The bin-packing optimization process can be implemented using a next fit (NF) optimization, a first fit (FF) optimization, a first fit decreasing (FFD) optimization, a best fit (BF) optimization, a best fit decreasing (BFD) optimization, or a branch and bound (B&B) optimization.

The optimization measure for performing the bin-packing optimization can include one or more of: a first term that measures a ratio of: the number of candidate resource pools that include one or more databases in the set of candidate resource pools, and a total number of available resource pools; a second term computed based on the number of candidate resource pools in the set of candidate resource pools and the total number of available resource pools, or a third term that measures a ratio of: a total unused capacity of the set of candidate resource pools and a total capacity of the set of candidate resource pools. In one particular example, the optimization measure can be computed as an average or a weighted sum of the first term, the second term, and the third term.

Figure 2D:
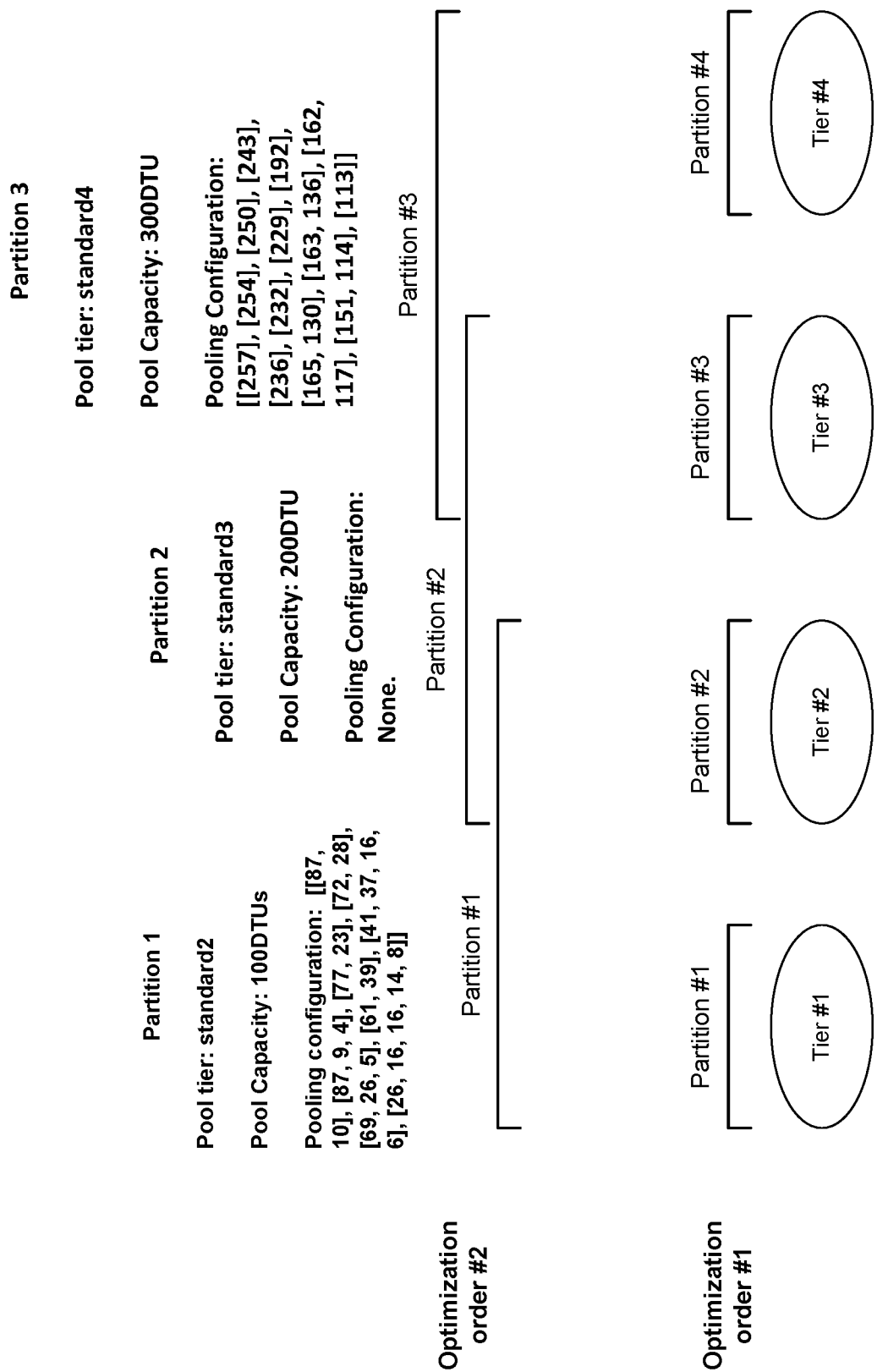
FIG. 2D shows an example of pooling the databases in each partition into candidate resource pools.

FIG. 2D shows an example of pooling the databases in each partition into candidate resource pools for a particular optimization order. As shown in FIG. 2D, for optimization order #2, there are three partitions: Partition 1, Partition 2, and Partition 3. Each candidate resource pool has a computation capacity corresponding to the highest computation capacity tier of the databases in the particular partition. For example, each candidate pool in Partition 1 has a capacity of 100 total DTUs, each candidate pool in Partition 2 has a capacity of 200 total DTUs, and each candidate pool in Partition 3 has a capacity of 300 total DTUs. The bin-packing optimization process produces 8 candidate pools in Partition 1, 0 candidate pools in Partition 2, and 13 candidate pools in Partition 3. The number shown in the pooling configuration refers to the aggregated utilization DTUs for each database.

Referring back to FIG. 1, after the sets of candidate resource pools have been generated, the system 100 selects a final set of pools for output according to a selected optimization order. As discussed above and illustrated by FIG. 2C, a higher optimization order results in partitions with an increased level of intra-grouping of databases assigned to different initial capacity tiers. As a typical trend, pooling based on partitions resulting from a higher optimization order can exhibit a lower performance metric but a higher cost saving metric, since more databases tend to be pooled into a single pool. In order to select the optimization order that best suits a particular application scenario, the system 100 can determine a value for a performance measure and/or a value for a cost saving measure for the respective set of candidate resource pools in each optimization order, and select the optimization order based on the values for the performance measure and/or the values for the cost saving measure for the optimization orders. In some implementations, the system 100 allows a user to select a configuration parameter to balance performance and cost saving. That is, the system 100 can receive a user input indicating a preference of how much to emphasize performance compared to cost saving, and select the optimization order based on the user input.

Figure 3:
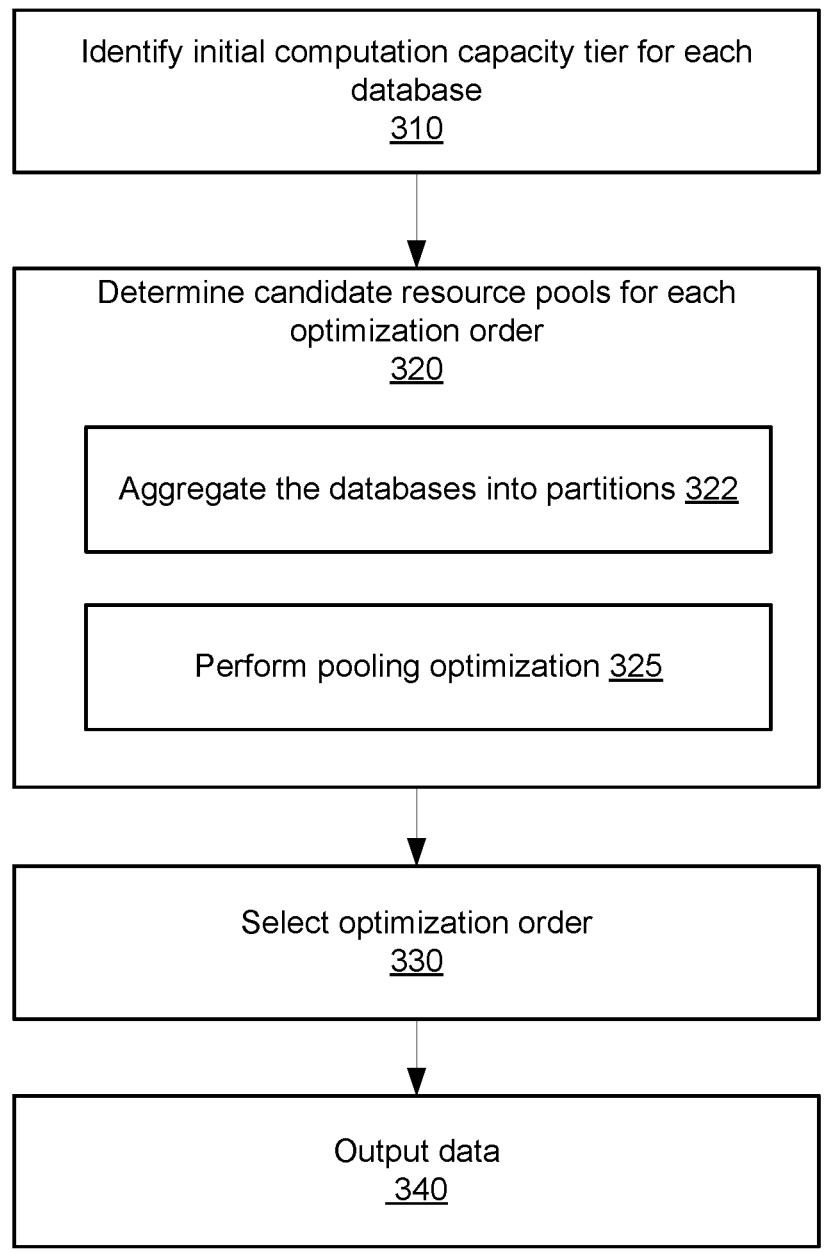
FIG. 3 is a flow diagram illustrating an example process for allocating computation resources to databases.

FIG. 3 is a flow diagram illustrating an example process 300 for allocating computation resources to a plurality of databases. For convenience, the process 300 will be described as being performed by a system of one or more computers located in one or more locations. For example, the system 100 described with reference to FIG. 1, appropriately programmed in accordance with this specification, can perform the process 300.

In step 310, for each respective database of the plurality of databases, the system identifies, from a list of computation capacity tiers, a respective initial computation capacity tier for the respective database based at least on the respective utilization of the respective database.

In step 320, for each respective optimization order of a set of optimization orders, the system determines a respective set of candidate resource pools for accommodating the plurality of databases.

In particular, in sub-step 322, the system aggregates the plurality of databases into a respective set of one or more partitions based at least on the respective optimization order and the identified initial computation resource tier of each database.

In sub-step 325, the system performs an optimization according to an optimization objective, to pool the databases in each particular partition in one or more of the respective set of partitions into candidate resource pools, wherein each candidate resource pool has a computation capacity corresponding to the highest computation capacity tier of the databases in the particular partition.

In step 330, the system selects an optimization order from the set of optimization orders, and determines a final set of resource pools for the plurality of databases by selecting the set of candidate resource pools for the selected optimization order.

In step 340, the system outputs data specifying the final set of resource pools.

Figure 4:
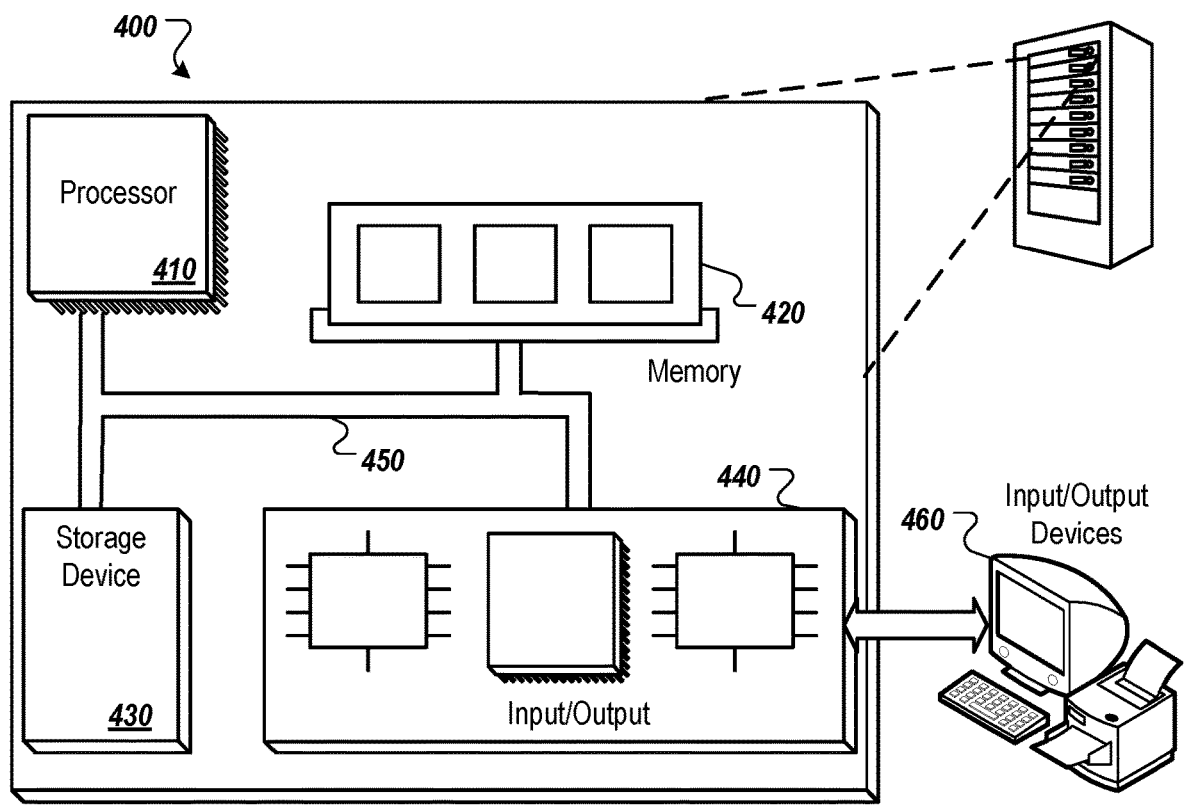
FIG. 4 shows an example computer system for performing operations for allocating computation resources to databases.

FIG. 4 shows an example computer system 400 that can be used to perform certain operations described above, for example, to perform the operations of the system 100 of FIG. 1. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large-capacity storage device.

The input/output device 440 provides input/output operations for the system 400. In one implementation, the input/output device 440 can include one or more network interface devices, for example, an Ethernet card, a serial communication device, for example, a RS-232 port, and/or a wireless interface device. In another implementation, the input/output device can include driver devices configured to receive input data and send output data to other input/output devices, for example, keyboard, printer and display devices 460. Other implementations, however, can also be used, such as mobile computing devices, mobile communication devices, set-top box television client devices, etc.

Although an example system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for allocating computation resources to a plurality of databases, comprising:
for each respective database of the plurality of databases, identifying, by a processor, from a list of computation capacity tiers, a respective initial computation capacity tier for the respective database based at least on respective utilization of the respective database;
for each respective optimization order of a set of optimization orders, determining, by the processor, a respective set of candidate resource pools for accommodating the plurality of databases, comprising:
aggregating, by the processor, the plurality of databases into a respective set of one or more partitions based at least on the respective optimization order and the identified initial computation resource tier of each database; and
performing, by the processor, an optimization according to an optimization objective, to pool respective databases of the plurality of databases in each particular partition in one or more of the respective set of partitions into candidate resource pools, wherein each candidate resource pool has a computation capacity corresponding to a highest computation capacity tier of the respective databases in the particular partition;
selecting, by the processor, an optimization order from the set of optimization orders, and determining a final set of resource pools for the plurality of databases by selecting the set of candidate resource pools for the selected optimization order; and
outputting, by the processor, data specifying the final set of resource pools.

2. The method of claim 1, wherein the optimization objective includes: minimizing a total number of the candidate resource pools in the set.

3. The method of claim 1, wherein the computation capacity characterizes one or more of: a CPU capacity, a memory capacity, or an 1/0 capacity.

4. The method of claim 1, wherein for each respective database of the plurality of databases, identifying, from the list of computation capacity tiers, a respective initial computation capacity tier based at least on respective utilization of the respective database comprises:
obtaining respective time-series data characterizing utilization of the respective database;
determining a respective aggregated utilization of the respective database based at least on the respective time-series data; and
identifying the respective initial computation capacity tier as one of the list of computation capacity tiers that corresponds to a computation capacity accommodating the respective database and being closest to the respective aggregated utilization of the respective database.

5. The method of claim 1, wherein:
the method further comprises receiving a user input identifying a statistical aggregation parameter; and
determining the respective aggregated utilization of the respective database comprises:
determining a respective value of the statistical aggregation parameter for the respective time-series data of the respective database; and
computing the respective aggregated utilization using the determined respective value of the statistical aggregation parameter and a buffer amount.

6. The method of claim 5, wherein the statistical aggregation parameter specifies a percentile value of the time-series data.

7. The method of claim 1, wherein the number of optimization orders in the set is the number of unique computation capacity tiers identified for the plurality of databases.

8. The method of claim 7, wherein the set of optimization orders includes a first optimization order, and aggregating the plurality of databases into the respective set of partitions for the first optimization order comprises:
aggregating the plurality of databases into a first set of partitions according to the identified initial computation capacity tier of each database, wherein each partition of the first set of partitions includes databases having the same identified initial computation capacity tiers.

9. The method of claim 8, wherein the set of optimization orders further includes one or more additional optimization orders, and aggregating the plurality of databases into the respective set of partitions for a particular additional optimization order comprises:
aggregating two or more neighboring partitions generated for a preceding optimization order into a single partition.

10. The method of claim 7, wherein for each particular partition, pooling the databases in the particular partition into a respective set of one or more candidate resource pools comprises:
performing a bin-packing optimization to place one or more databases in the particular partition into the respective set of one or more candidate resource pools according to an optimization measure.

11. The method of claim 10, wherein the optimality measure includes one or more of:
a first term that measures a ratio of: the number of candidate resource pools that include one or more databases in the set of candidate resource pools, and a total number of available resource pools;
a second term computed based on the number of candidate resource pools in the set of candidate resource pools and the total number of available resource pools, or
a third term that measures a ratio of: a total unused capacity of the set of candidate resource pools and a total capacity of the set of candidate resource pools.

12. The method of claim 10, wherein the optimality measure is computed as a weighted sum of the first term, the second term, and the third term.

13. The method of claim 10, wherein the bin-packing optimization includes: a next fit (NF) optimization, a first fit (FF) optimization, a first fit decreasing (FFD) optimization, a best fit (BF) optimization, a best fit decreasing (BFD) optimization, or a branch and bound (B&B) optimization.

14. The method of claim 1, wherein:
the method further comprises, for each respective optimization order of a set of optimization orders, after determining the respective set of candidate resource pools, determining one or more of: a value for a performance measure or a value for a cost measure of the respective set of candidate resource pools; and selecting the optimization order from the set of optimization orders comprises:
selecting the optimization order based on one or more of the values for the performance measure or the values for the cost measure for the optimization orders.

15. The method of claim 14, wherein:
the method further comprises receiving a user input indicating a level of preference for performance over cost saving; and
selecting the optimization order from the set of optimization orders comprises:
selecting the optimization order based on the level of preference for performance.

16. A system comprising one or more computers and one or more storage devices storing instructions that when executed by the one or more computers cause the one or more computers to perform operations of a computer-implemented method for allocating computation resources to a plurality of databases, comprising:
for each respective database of the plurality of databases, identifying, from a list of computation capacity tiers, a respective initial computation capacity tier for the respective database based at least on respective utilization of the respective database;
for each respective optimization order of a set of optimization orders, determining a respective set of candidate resource pools for accommodating the plurality of databases, comprising:
aggregating the plurality of databases into a respective set of one or more partitions based at least on the respective optimization order and the identified initial computation resource tier of each database; and
performing an optimization according to an optimization objective, to pool respective databases of the plurality of databases in each particular partition in one or more of the respective set of partitions into candidate resource pools, wherein each candidate resource pool has a computation capacity corresponding to a highest computation capacity tier of the respective databases in the particular partition;
selecting an optimization order from the set of optimization orders, and determining a final set of resource pools for the plurality of databases by selecting the set of candidate resource pools for the selected optimization order; and
outputting data specifying the final set of resource pools.

17. The system of claim 16, wherein the optimization objective includes: minimizing a total number of the candidate resource pools in the set.

18. The system of claim 16, wherein the computation capacity characterizes one or more of: a CPU capacity, a memory capacity, or an 1/0 capacity.

19. One or more non-transitory computer storage media encoded with instructions that, when executed by one or more computers, cause the one or more computers to perform the operations of a computer-implemented method for allocating computation resources to a plurality of databases, comprising:
for each respective database of the plurality of databases, identifying, from a list of computation capacity tiers, a respective initial computation capacity tier for the respective database based at least on respective utilization of the respective database;
for each respective optimization order of a set of optimization orders, determining a respective set of candidate resource pools for accommodating the plurality of databases, comprising:
aggregating the plurality of databases into a respective set of one or more partitions based at least on the respective optimization order and the identified initial computation resource tier of each database; and
performing an optimization according to an optimization objective, to pool respective databases of the plurality of databases in each particular partition in one or more of the respective set of partitions into candidate resource pools, wherein each candidate resource pool has a computation capacity corresponding to a highest computation capacity tier of the respective databases in the particular partition;
selecting an optimization order from the set of optimization orders, and determining a final set of resource pools for the plurality of databases by selecting the set of candidate resource pools for the selected optimization order; and
outputting data specifying the final set of resource pools.

20. The one or more non-transitory computer storage media of claim 19, wherein the optimization objective includes: minimizing a total number of the candidate resource pools in the set.

* * * * *